United States Patent
Burnett et al.

(10) Patent No.: US 11,157,651 B2
(45) Date of Patent: Oct. 26, 2021

(54) SYNCHRONIZING MASKING JOBS BETWEEN DIFFERENT MASKING ENGINES IN A DATA PROCESSING SYSTEM

(71) Applicant: Delphix Corp., Redwood City, CA (US)

(72) Inventors: Nathan C. Burnett, Somerville, MA (US); Nathanael M. Van Vorst, Boston, MA (US); Michelle Young Suh, Cambridge, MA (US); Theodore P. Kyriakakis, Windham, NH (US); Rachael M. Naphtal, Boston, MA (US); Benjamin S. Page, Boston, MA (US)

(73) Assignee: Delphix Corporation, Redwood City, CA (US)

( * ) Notice: Subject to any disclaimer, the term of this patent is extended or adjusted under 35 U.S.C. 154(b) by 288 days.

(21) Appl. No.: 16/205,149

(22) Filed: Nov. 29, 2018

(65) Prior Publication Data
US 2020/0175202 A1 Jun. 4, 2020

(51) Int. Cl.
*G06F 21/62* (2013.01)
*G06F 16/178* (2019.01)

(52) U.S. Cl.
CPC ...... *G06F 21/6254* (2013.01); *G06F 16/1794* (2019.01)

(58) Field of Classification Search
CPC .. G06F 21/6254; G06F 16/1794; G06F 16/25; G06F 16/27; G06F 21/62; G06F 16/178; G06F 21/6245; G06F 16/1787; G06F 9/30018; G06F 7/764; G06F 2207/7242
See application file for complete search history.

(56) References Cited

U.S. PATENT DOCUMENTS

| | | | |
|---|---|---|---|
| 2015/0142740 A1* | 5/2015 | Behuria | G06F 40/18 707/634 |
| 2016/0092525 A1* | 3/2016 | Kothari | G06F 16/27 707/602 |
| 2017/0098093 A1* | 4/2017 | Koo | G06F 21/6209 |

* cited by examiner

*Primary Examiner* — Quazi Farooqui
(74) *Attorney, Agent, or Firm* — Fenwick & West LLP

(57) ABSTRACT

A data processing system maintaining a plurality of masking engines is configured to synchronize masking jobs between different masking engines, in order to ensure consistent outputs between the different engines for the same job. Upon identifying a masking job object maintained by a first masking engine to be exported, dependencies of the job object are traversed to identify all objects depended on by the job object, which are used to form an export payload. At least object of the payload is a reference object that references other objects maintained by the first masking engine. When importing the export payload onto a second masking engine, the export payload is analyzed to identify revision information of the referenced object. The identified revision information is compared with revision information of a corresponding object maintained by the second masking engine, and the referenced objects is imported based upon a result of the comparison.

18 Claims, 6 Drawing Sheets

SYNCHRONIZING MASKING JOBS BETWEEN DIFFERENT MASKING ENGINES IN A DATA PROCESSING SYSTEM

BACKGROUND

This invention relates generally to masking sensitive data and in particular to synchronizing and exporting masking jobs between different masking engines.

Software applications used by enterprises often incorporate sensitive data for which access must be carefully controlled. Certain privileged users may be allowed access to the sensitive data. However, several users of systems of an enterprise may not be given access to the sensitive data. These users need to handle representative data for specific purposes. For example, if there is a defect or bug in a program, developers and testers often need to reproduce the conditions under which the defect was caused. This often requires using the original dataset, for example, to reproduce the original conditions. However, the developers and testers are not privileged users and are not allowed to have access to the sensitive data. Enterprises often use data masking to transform or obfuscate the sensitive data such that the original sensitive data cannot be discerned by users.

SUMMARY

Embodiments are directed to systems and methods for synchronizing objects between masking engines. A data processing system may implement a plurality of masking engines for performing masking jobs on the data of one or more data stores. In some cases, multiple masking engines may need to be used to perform a masking job. In order to ensure that data is masked consistently across different masking engines, the masking job needs to be synchronized, such that the algorithms used by each engine will produce consistent results. For example, the data processing system may implement multiple engines for performing masking jobs for purposes of backup and disaster recovery, in which in the event of a disaster that results in a first engine becoming unusable during the course of a job, one or more replacement engines may be used to continue performance of the job. In some embodiments, the ability to synchronize a job between different engines may be useful for horizontal scaling purposes. For example, for jobs involving a large amount of data, many engines can be deployed in order to scale out the masking to be performed on the data. The individual masking jobs will need to be synchronized in order to ensure consistent masking across the data sources being masked.

In some embodiments, a method for synchronizing objects between masking engines comprises, at a first masking engine identifying a first object maintained by the first masking engine to be exported. The method further comprises traversing one or more dependencies of the first object to identify a set of objects that the first object is dependent upon, wherein at least one object of the set of objects is a reference object referencing a second object maintained by the first masking engine. An export payload is generated that contains the first object and the set of identified objects. The method further comprises receiving, at a second masking engine, the export payload generated at the first masking engine, and identifying revision information of the reference object contained within the export payload. The identified revision information is compared with revision information of a corresponding object maintained by the second masking engine, and the objects of the export payload are imported based upon a result of the comparison.

In some embodiments, the first object corresponds to a masking job configured to replace a subset of data within a corpus of data identified as sensitive with masked data.

In some embodiments, the second object referenced by the reference object corresponds to an algorithm object having a set of instructions for mapping one or more input data values to masked data values.

In some embodiments, the method further comprises, responsive to a determination that the identified revision information matches the revision information of the corresponding object, reporting a failure in importing the reference object to the second masking engine. Furthermore, the first object may be imported onto the second masking engine, and configuring the first object to depend upon the corresponding object.

In some embodiments, the revision information of the reference object comprises an object identifier identifying the reference object, and a revision identifier identifying a revision state of the reference object. Responsive to a determination that the identified revision information does not match the revision information of the corresponding object, and that the object identifier of the identified revision information does not match that of the revision information of the corresponding object, second object may be imported into the second masking engine.

In some embodiments, the first set of objects includes a rule set object indicating a structure of data to be processed by a job corresponding to the first object, a file format object indicating a format of the data to be processed, and/or a target connector object comprising information for accessing a database storing at least a portion of the data.

The features and advantages described in this summary and the following detailed description are not all-inclusive. Many additional features and advantages will be apparent to one of ordinary skill in the art in view of the drawings, specification, and claims.

Figure 1:
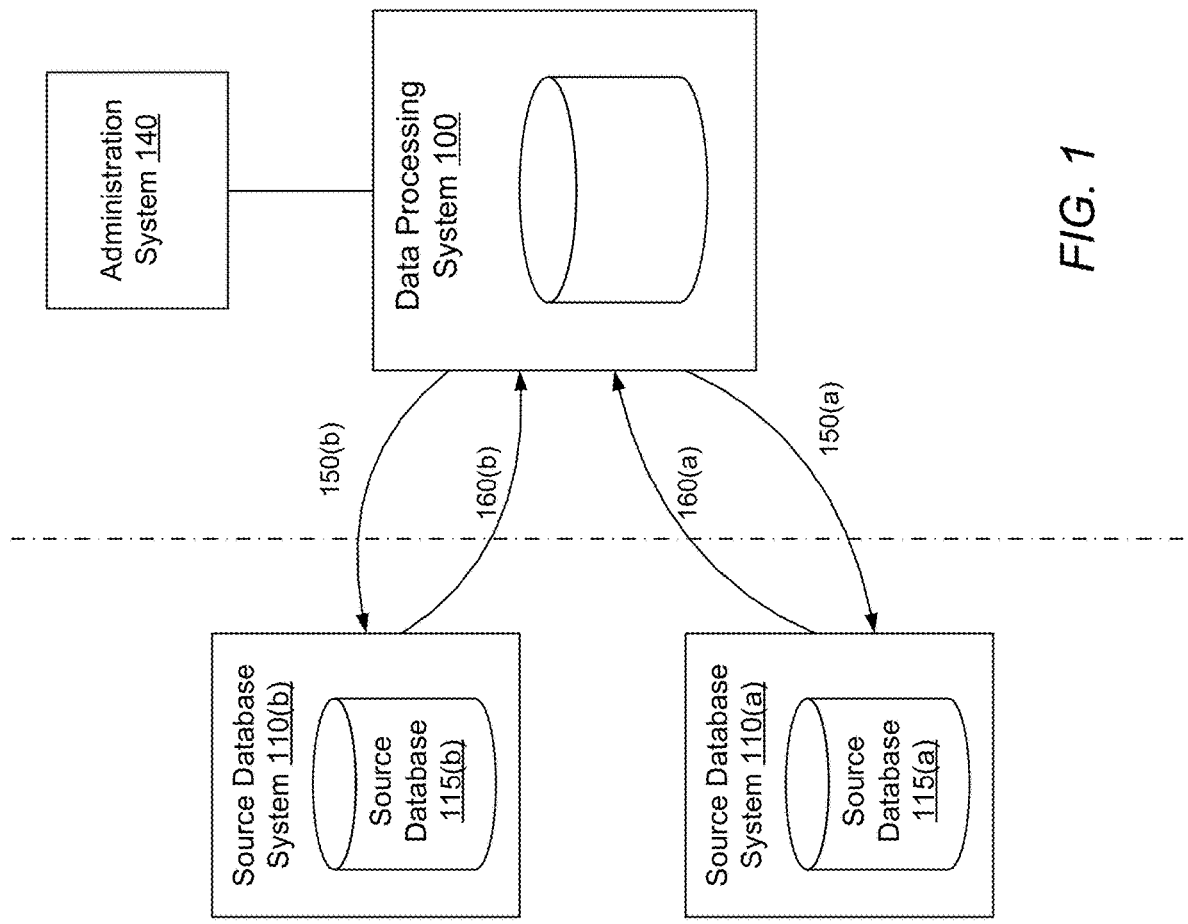
FIG. 1 is diagram illustrating a data processing system able to performing masking jobs, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A data processing system is configured to access data from one or more source data stores and perform one or more operations on the accessed data. In some embodiments, the data processing system implements one or more engines for performing different types of jobs. For example, the data processing system may implement a plurality of masking engines for performing masking jobs on the data of one or more data stores. In some embodiments, masking jobs may be divided into profiling jobs, which examine data contained within one or more databases to identify sensitive data (e.g., financial data, PII, etc.) that may need to be masked, and masking jobs, which mask the identified sensitive data. In some embodiments, profiling jobs and masking jobs may collectively be referred to as masking jobs.

Masking may be performed on data to obfuscate sensitive data in data stores and files in a consistent manner. Masked copies of the data can be safely distributed to users who do not need access to, for example, personally identifiable customer information, but do need the non-PII portion of the data. Since applications that use the masked data may make assumptions about the data (e.g., that a customer has only one name), the data should be masked consistently. For example, if data corresponding to the name "John Doe" is mapped to "Fred Smith" when masking a database associated with a first user, the same mapping should be performed whenever the name "John Doe" appears in other databases of the first user.

Enterprises often store large amounts of data in a distributed system comprising heterogeneous data stores, such as using relational databases, files of various different formats, etc. In addition, a masking process may depend upon a large number of different parameters, such as randomly generated sequences, various predefined mapping structures for mapping keywords in a specific fashion, etc. When masking large amounts of distributed data, multiple processes may need to be used. However, if the processes are out of sync, inconsistent mapping results may be generated. For example, if two different processes perform masking using different versions of a masking table or a different random number sequences, the resulting masked results may be inconsistent and unsuitable for use (e.g., for debugging and analysis purposes).

In some cases, multiple masking engines may need to be used to perform a masking job. In order to ensure that data is masked consistently across different masking engines, the masking job needs to be synchronized, such that the algorithms used by each engine will produce consistent results. Although techniques disclosed herein are described in connection with database systems, they can be applied to other forms of data stores, for example, data stores storing data in unstructured form (such as text files) or semi structured form (such as XML files).

For example, the data processing system may implement multiple engines for performing the same type of job (e.g., masking jobs) for purposes of backup and disaster recovery. For example, in the event of a disaster that results in a first engine becoming unusable during the course of a job, one or more replacement engines may be used to continue performance of the job. However, the replacement engines might not have the same hardware specifications as the original engine. Simply restoring an engine from a backup may not result in a usable configuration if the original engine is replaced with several smaller engines. As such, it may be useful to be able to restore individual jobs in order to distribute the load of the original engine.

In some embodiments, the ability to synchronize a job between different engines may be useful for horizontal scaling purposes. For example, a particular user may possess a large data estate that may be impractical to mask using a single engine (e.g., due to the amount of processing required). Instead, many engines can be deployed in order to scale out the masking to be performed on the data. However, the individual masking jobs will need to be synchronized in order to ensure consistent masking across the data sources being masked. For example, the algorithms being used across all the engines will need to be synchronized.

In order to reproduce a masking job across different masking engines, several pieces of state may be needed in order to replicate the behavior of the job, which may include mappings of algorithms to different types of data, inputs to the algorithms, such lists of output values, encryption keys, and/or the like.

System Overview

FIG. 1 is diagram illustrating a data processing system able to performing masking jobs, according to an embodiment of the invention. One or more source database systems 110 manage data for an organization. The data processing system 100 is able to access data of source databases 115 stored in the one or more source database systems 110. In some embodiments, the data processing system 100 retrieves the source data from the source databases 115 and stores the data in an efficient manner for use in performing various jobs (e.g., masking jobs). A database administrator user interface allows a database administrator to perform various actions supported by the data processing system 100, such as initiating various jobs on the stored data within the source database systems 110.

In response to a request from the administration system 140, or based on a predefined schedule, or some combination thereof, the data processing system 100 sends a request 150 for data to a source database system 110. The source database system 110 responds by sending information stored in the source database as a stream of data 160.

The stored data may be used for various functions, such as creating virtual databases, analysis by one or more users, performing masking jobs, and/or the like. In some embodiments, the data stored and manipulated by the data processing system 100 may be viewed by one or more users through a file sharing system, sent back to a respective source database 115, and/or the like.

In an embodiment, the data processing system 100 stores received and processed data in one or more containers. A container may be an unsecure container or a secure container. An unsecure container may store unmasked sensitive data, which corresponds to sensitive data in its original format as obtained from the source database. The data processing system may require a user to have certain privileges to access sensitive data of unsecure containers. A secure container may store sensitive data in masked format. The data processing system may allow access to data associated with secure containers to users with lower privileges compared to users allowed to access unsecure containers. In an embodiment, the data processing system creates a secure container corresponding to an unsecure container by processing and masking the data within the unsecure container.

While FIG. 1 illustrates the data processing system 100 issuing requests 150 to the source databases 115 to receive streams of data 160, in other embodiments, one or more job engines (e.g., masking engines) maintained by the data processing system 100 may each access the sources databases 115 independently. For example, a masking engine may access a source database 115 to perform a masking job on the data of the source database 115, without needing to first retrieve the data from the source database 115 to the data processing system 100. In some embodiments, the masking engine creates masked data from data on the source database 115, where the masked data is added to the source database or replaces the original un-masked data on the source database. In other embodiments, the masking engine creates masked data to be stored on a different, target database.

Figure 2:
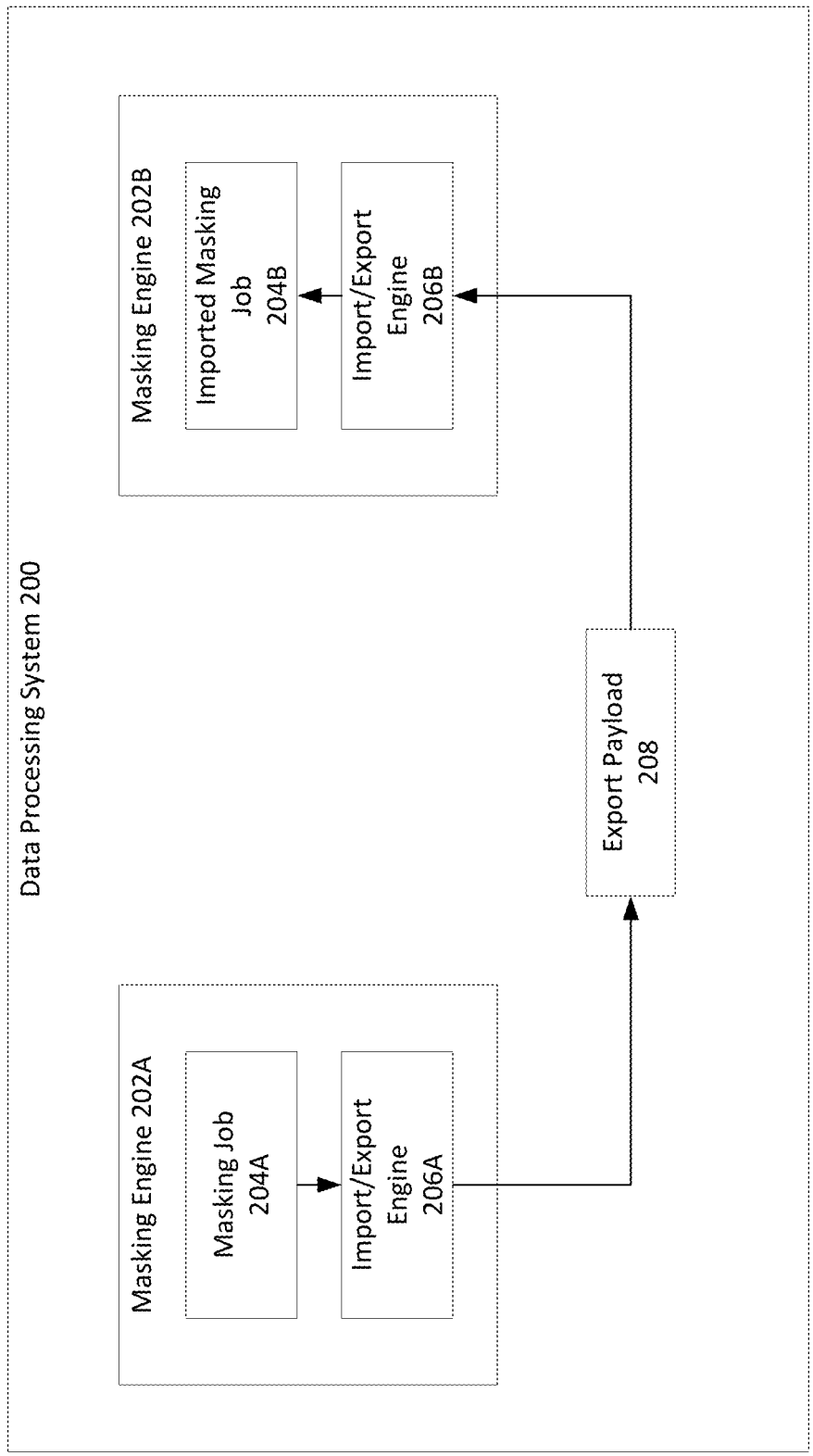
FIG. 2 illustrates a diagram of a data processing system having multiple job engines, in accordance with some embodiments.

FIG. 2 illustrates a diagram of a data processing system having multiple masking job engines, in accordance with some embodiments. As discussed above with relation to FIG. 1, a data processing system (e.g., the data processing system 100 illustrated in FIG. 1) may maintain a plurality of engines for performing jobs on data of one or more data stores managed by the data storage system. For example, the data processing system 200 illustrated in FIG. 2 may maintain a first masking engine 202A, and a second masking engine 202B.

In some embodiments, the first masking engine 202A may be a "primary" masking engine, while the second masking engine 202B may be a "secondary" or "backup" masking engine that is only used when the first masking engine 202A is offline or otherwise unavailable for use. In some embodiments, a primary masking engine may be more powerful than the secondary masking engine (e.g., having access to a greater amount of hardware), and may need to be replaced with multiple secondary masking engines in order to be able to perform masking jobs at the same rate in the event that the primary engine goes offline. In some embodiments, the first and second masking engines 202A and 202B may both be used in parallel to handle one or more jobs.

The first masking engine 202A may maintain one or more applications and environments having one or more masking jobs, including a masking job 204A. As used herein, an application may refer to a container maintained by a masking engine that contains at least one environment, and an environment may refer to container that contains at least one masking job (which, as discussed above, may correspond to a profiling job or a masking job). As such, different masking jobs maintained by a particular masking engine may be organized using applications/environments. In order to allow the second masking engine 202B to also perform the masking job 204A, due to the first masking engine 202A becoming unavailable or such that the masking engines 202A and 202B may both process the job in parallel to mask a larger amount of data, the job must be synchronized between the different masking engines. As used herein, a job may be referred to as "synchronized" between two different masking engines, if each of the masking engines performing the job would produce the same masked inputs for the same inputs. As such, when the masking job 204A is synchronized between the first masking engine 202A and the second masking engine 202B, the masked results produced by the masking engines 202A and 202B as part of the job will be the same as the results of if the first masking engine 202A has performed the entire job on its own.

Different jobs may depend upon different objects, such as sets of rules and algorithms. In addition, objects that a job is dependent upon may have an internal state (e.g., random values such as a key or salt) that will need to be communicated between the masking engines if the job is to be synchronized between the masking engines. Furthermore, objects may be revised or modified by different users at different times. In order to ensure synchronization of the job on the different masking engines, it is necessary to ensure that the objects depended upon by the job have the same revision status, or else different results may be produced.

In order to synchronize a masking job between the first and second masking engines 202A and 202B, the first masking engine 202A may maintain an import/export module 206A. The import/export module 206A receives the masking job 204A, identifies all objects that the masking job 204A is dependent upon, and generates an export payload 208 corresponding to the masking job 204A. The export payload 208 may comprise information indicating the identified objects, status or state information associated with the objects, a revision version of the object, and any other information needed by another masking engine to synchronize the job. In some embodiments, the export payload 208 is in the form of a JSON object. In some embodiments, the export payload 208 may include at least a portion of the identified objects. For example, the export payload 208 may include the actual job object itself and objects corresponding to at least a portion of its identified dependencies. On the other hand, certain objects that are likely to be shared between multiple jobs or engines (e.g., global objects) may be referenced by the export object 208 but not contained within the export object 208 itself. Instead, the referenced global objects may be imported to a destination masking engine separately (as needed).

Although FIG. 2 illustrates the import/export modules 206 as part of the masking engines 202, in some embodiments, the import/export module 206 may be a separate component from the masking engines 202. For example, a masking engine 202 may submit information corresponding to a masking job 204 to a shared import/export module 206, which may generate an export payload 208 based upon the submitted masking job 204.

The export payload 208 may be shared with one or more other masking engines (e.g., the second masking engine 202B). For example, in some embodiments, the same export payload 208 may be used to synchronize the job with a plurality of different masking engines, allowing for the plurality of masking engines to process the job in parallel. This may be used in cases where the data to be processed by the masking job is too large to be processed by a single masking engine in a reasonable amount of time.

The second masking engine 202B receives the export payload at the import/export module 206B. As illustrated in FIG. 2, each masking engine 202 may have its own import/export module 206, allowing for each of the masking engines to individually import received export payloads 208 to synchronize jobs with other masking engines. For example, the import/export module 206B of the second masking engine 202B may process the export payload 208 to generate an imported masking job 204B that is synchronized with the masking job 204A of the first masking engine 202A.

Once the different masking engines 202 have synchronized jobs (e.g., masking job 204A and imported masking job 204B), each of the masking engines 202A and 202B may perform operations in accordance with the masking job. For example, each of the masking engines 202A and 202B may perform the masking job by masking different data associated with the masking job.

Masking Engine

Figure 3:
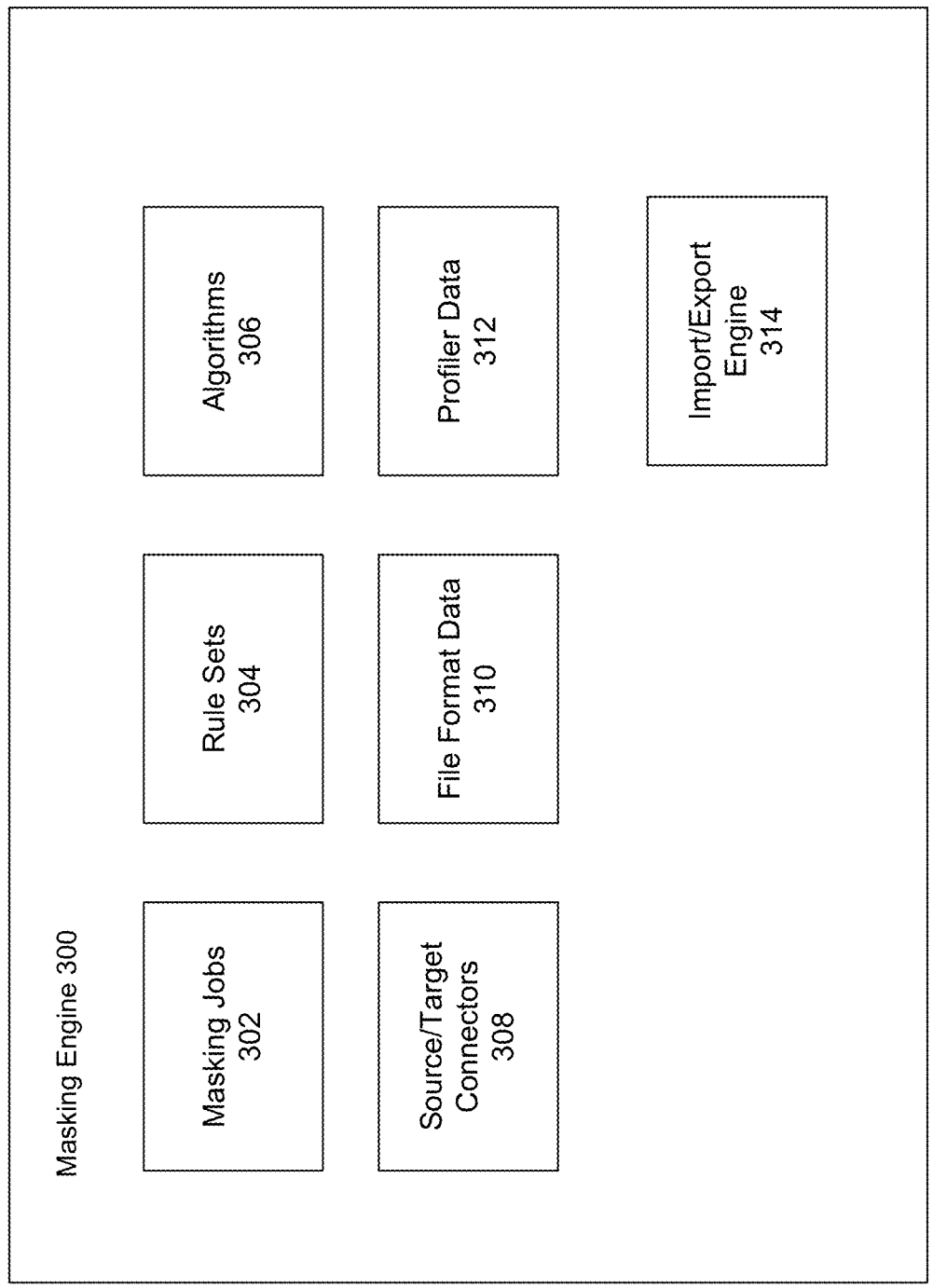
FIG. 3 illustrates components of a masking engine, in accordance with some embodiments.

FIG. 3 illustrates components of a masking engine, in accordance with some embodiments. The masking engine 300 of FIG. 3 may correspond to the first or second masking engine 202A or 202B illustrated in FIG. 2. The masking engine 300 maintains one or more different types of objects, which may include job objects 302, rule sets 304, algorithms 306, source/target connectors 308, file format data 310, profiler data 312, and/or the like. In other embodiments, the masking engine 300 may maintain more or fewer types of objects than those illustrated in FIG. 3.

As used herein, a "synchronizable" object may refer to an object maintained by a masking engine that can be exported (e.g., using the import/export module) from one masking engine to be imported by another masking engine. In some embodiments, synchronizable objects can include jobs (e.g., masking jobs), rule sets, certain types of algorithms, connectors, file format data, and/or like.

The masking job object 302 may correspond to a particular masking job to be performed by the masking engine 300. In some embodiments, the masking job object 302 may correspond to a profiling job (for examining data and identifying a subset of the data as sensitive data that should be masked), a masking job (for masking the sensitive data identified by a profiling job), or both. In some embodiments, the masking job object 302 indicates a corpus of data to be examined and masked (e.g., data stored in one or more files), at least one source database that the data is stored on, a type of masking to be performed, and/or the like. The masking job object further indicates one or more dependent objects that will be used by the masking engine 300 when performing the masking job, such as a rule set, one or more algorithms, one or more connectors, etc. In some embodiments, certain data associated with the masking job (e.g., an indication of the corpus of data to be examined and masked) is not indicated in the masking job object 302 itself, but may be indicated by a different object upon which the masking job object 302 depends (e.g., by a connector object 308 that the masking job object 302 depends upon).

The rule set object 304 may comprise data indicating a structure of the data to be masked by a masking job (e.g., as indicated by the masking job object). For example, the rule set may indicate a database schema used by the data, how fields in the scheme map to masking algorithms, and/or the like.

The algorithm object 306 may correspond to one or more algorithms to be used in masking. An algorithm comprises a set of instructions that are stored in a computer readable memory and can be executed by a processor. Example types of algorithms may include lookup algorithms (e.g., binary lookup), segmenting algorithms, tokenization algorithms, mapping algorithms, and/or the like. In some embodiments, multiple algorithms (corresponding to multiple algorithm objects) may be used to mask data of a particular field. For example, data of a particular field may be first segmented using a segmenting algorithm, whereupon the segments are mapped to masked data using a mapping algorithm. In some embodiments, the algorithm object 306 is associated with one or more data structures (e.g., a lookup structure for performing lookup and/or mapping). For example, the lookup structure may comprise a file containing a list of possible output values to use when masking. Examples of lookup algorithms that may be used are described in U.S. Pat. No. 9,054,872, while examples of segmenting algorithms are described in U.S. Pat. No. 8,533,470, both of which are hereby incorporated by reference in their entireties.

In addition, the algorithm object may be associated with a key or salt corresponding to a random or pseudo-random sequence, allowing for the algorithm to produce unique results in comparison to other instances of the algorithm of the same type. For example, an algorithm for masking names may replace "John Doe" with "Fred Smith" when a first key value is used. On the other hand, if a second, different key value is used, the same algorithm may map "John Doe" to a different value, such as "William Brown." As such, when synchronizing a masking job across different masking engines, it may be important to ensure that the algorithm object is synchronized such that each masking engine will use the same key for the algorithm, ensuring consistent masked values regardless of which engine is the one that masked the data.

As used herein, an algorithm object may correspond to a particular instance of an algorithm. For example, the masking engine may have multiple algorithm objects corresponding to the same type of algorithm, where each algorithm object may be associated with a different state (e.g., lookup files, key/salt).

Many algorithms can be used for many different masking jobs, regardless of the actual data being masked. As such, in some embodiments, the algorithm object 306 may comprise a reference to a global algorithm object, instead of containing data for the actual algorithm. As used herein, a global object (such as a global algorithm object) may correspond to an object maintained by the masking engine 300 that is not part of the applications or environments used by the masking engine 300 to organize different masking jobs 302. Instead, each global object can be referenced by multiple masking jobs (directly or indirectly) maintained by the masking engine. In some embodiments, global objects may be maintained independently from the masking job engines of the data storage system, such that a particular global object can be utilized by multiple different masking job engines for performing masking jobs. For example, one or more global objects may be maintained as part of a shared pool accessible by multiple different masking job engines. A masking job object on a first masking engine may refer to one or more global algorithm objects by references. The actual algorithms objects may be downloaded onto the masking job engine only when the masking job is run.

The source/target connector object 308 comprise information indicating how to access the source database to retrieve the data to be masked. In some embodiments, the connector object 308 may include one or more Java Database Connectivity (JDBC) parameters, SSH File Transfer Protocol (SFTP) credentials, authentication information, etc., corresponding to the source database that the data to be masked is stored on.

The file format data 310 comprises data indicating how the data to be masked is formatted. For example, the file format data 310 may indicate a list of fields corresponding to columns of a CSV file or an XML schema. For example, a rule set may depend upon the file format data 310 to determine fields corresponding to data to be masked, and map each field to one or more algorithms 306.

The profiler data object 312 may comprise data used to detect sensitive data within the retrieved data to be masked. For example, in some embodiments the profiler data object contains one or more regular expressions corresponding to types of sensitive data.

The import/export module 314 may correspond to the import/export module 206 illustrated in FIG. 2. The import/export module 314 may receive the masking job object 302, and identify all other objects that the masking job object 302 is dependent upon. The import/export module 314 packages the identified objects into a single export payload, which may be exported to other masking job engines, in order to synchronize the masking job between the different engines. In some embodiments, the import/export module 314 may further encrypt the export payload. For example, the import/export module 314 may encrypt an export payload with a passphrase. Once encrypted, the import/export module 314 may forget the passphrase, and a user wishing to import the export payload to another engine may need to provide the passphrase in order to do so. In some embodiments, each export payload may be provided with a digital signature to prevent modification. In some embodiments, the import/export module 314 may create multiple export payloads corresponding to multiple job objects in a batch fashion.

In some embodiments, the import/export module 314 exposes an API endpoint to a user, allowing the user to perform various operations using the import/export module 314. For example, in some embodiments, a user may request a list of all synchronizable and exportable objects within an engine, export one or more objects, import a payload exported by another engine, and/or the like.

Object Dependencies

As discussed above, a masking job object may be dependent on a plurality of other objects. As such, an export payload corresponding to the masking job may include objects corresponding to the job itself, but also a rule set, a connector to a target database, algorithms used by the job, and any dependencies of those algorithms. In order to assemble the export payload, the import/export module of the masking job engine must be able to automatically determine the dependencies of the job object to be exported, such that the export payload will contain sufficient information to successfully replicate the job on a different engine.

Figure 4:
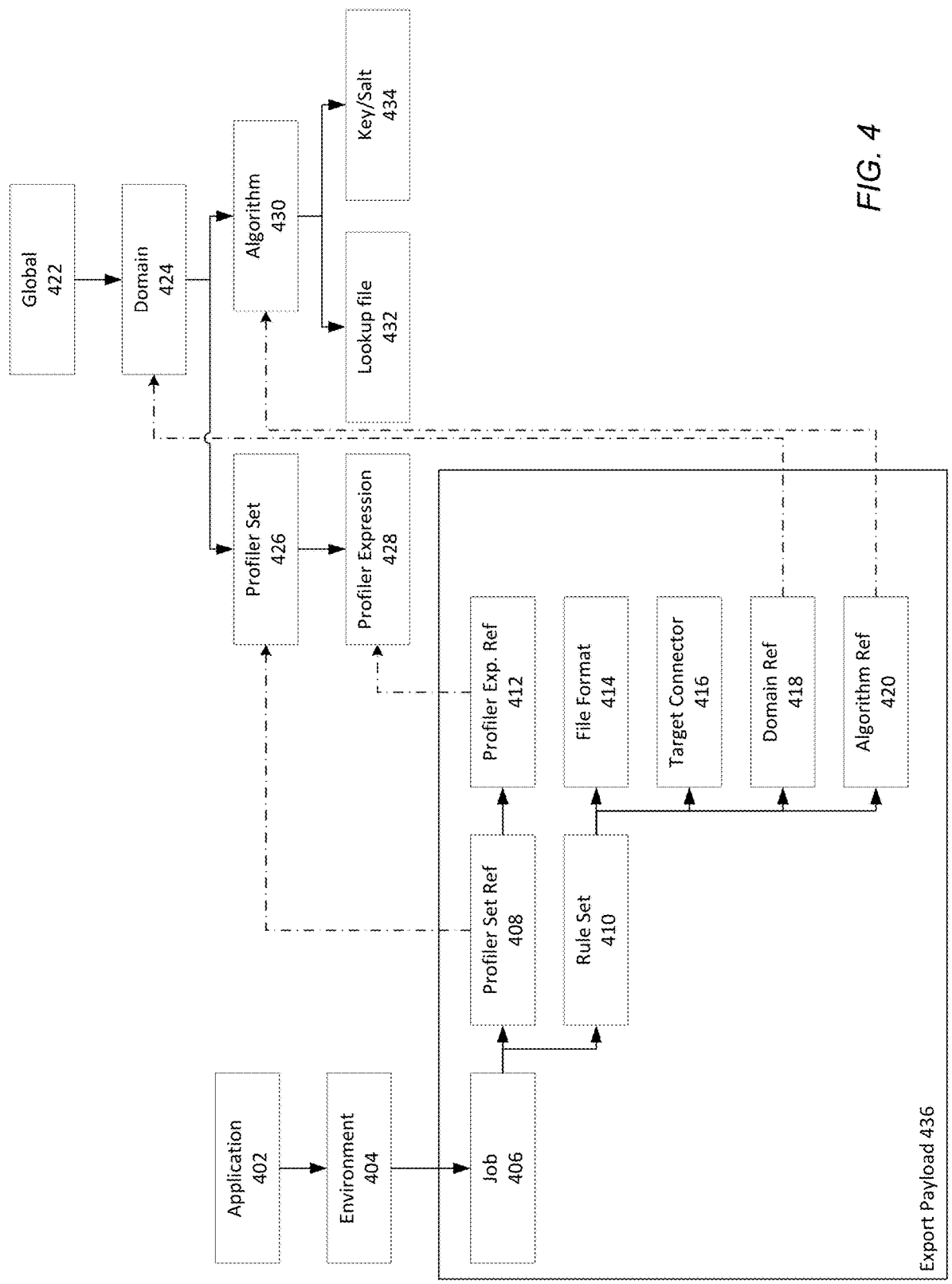
FIG. 4 illustrates example dependencies between different objects that may form an export payload, in accordance with some embodiments.

FIG. 4 illustrates example dependencies between different objects that may form an export payload, in accordance with some embodiments. As illustrated in FIG. 4, solid lines and arrows indicate dependencies, while dashed lines and arrows indicate references. For example, an algorithm reference as illustrated in FIG. 4 does not correspond to a complete algorithm, but is a reference to an algorithm.

In some embodiments, a masking engine (e.g., a masking engine 202 illustrated in FIG. 2) maintains one or more job objects 406 (e.g., corresponding to different masking jobs). In some embodiments, the job objects 406 maintained by the engine are organized into one or more folders or containers. For example, as illustrated in FIG. 4, a job object 406 may be part of an environment 404 and an application 402, which correspond to different levels of containers. The application 402 may correspond to a container having one or more environments 404, wherein each job object 404 is contained within a particular environment 404.

Each environment 404 may contain one or more job objects 406. As discussed above, each job object 406 may be dependent upon a plurality of other objects. In some embodiments, the job object 406 directly depends upon one or more objects, such as a profiler set reference object 408 and a rule set object 410, which may in turn depend upon additional objects. The import/export module of the masking engine containing the job object 406 may access the job object 406 to determine which other objects it is directly dependent upon. Once the import/export module determines the objects that the job object 406 directly depends upon, the import/export module may then identify any objects that the determined objects are dependent upon. As such, the import/export module may continue to traverse down one or more chains of dependencies until all objects that the job object 406 is dependent upon (directly or indirectly) are identified.

The profiler set reference object 408 corresponds to a reference to a profiler set object 426. The profiler set object 426 is a set of profiler expressions that may be used together to profile data from a database (e.g., identify sensitive data within the database). The profiler set reference object 408 may be dependent upon one or more profiler expression reference objects 412, each of which may correspond to a profiler expression object 428. The profiler expression object 428 comprises a regular expression usable to detect sensitive data. For example, a profiler expression object 428 may comprise one or more patterns that sensitive data will conform to (e.g., credit card numbers, social security numbers, etc.), allowing for the sensitive data to be identified.

The rule set object 410 indicates a structure of the data to be masked by the masking job corresponding to the job object 406. For example, the rule set object 410 may depend upon a file format object 414, a target connector object 416, a domain reference object 418, and algorithm reference objects 420. While FIG. 4 illustrates a particular structure of dependencies, it is understood that in other embodiments, a job object 406 may have a dependency structure different from that illustrated in FIG. 4. For example, in some embodiments, a domain reference 418 may further be dependent upon an algorithm reference 420. In some embodiments, a rule set 410 and a domain reference 418 may depend upon the same algorithm reference 420.

As used herein, a domain may correspond to a category of data. For example, a domain may correspond to a column or field of data (e.g., "first name," "last name," "zip code," etc.). In some embodiments, data to be masked is categorized into domains (e.g., using a profiling job), where each domain is associated with its own profiler set (e.g., for identifying sensitive data within data of the domain) and algorithms for use in masking data of the type corresponding to the domain. For example, different algorithms may be used to mask data that is of the "first name" type as compared to data of the "social security number" type. As such, the corresponding domains are each associated with different algorithms.

In some embodiments, objects such as domain objects 424, profiler set objects 426, and algorithm objects 430 are not part of any particular application or environment, instead being usable by many different applications and environments. For example, a domain 424 corresponding to a particular field of data (e.g., "first name") may be common to multiple sets of data corresponding to multiple different masking jobs. As such, different job objects 406 may reference the same domains, profiler sets, and algorithms. In some embodiments, these objects can be accessed through a global object 422, which may correspond a placeholder object that lists as its dependencies all objects that are global to the masking engine. In some embodiments, a user may synchronize a global object between different masking engines to synchronize all domains, profiler sets, and algorithms between the masking engines.

In some embodiments, an algorithm object 430 may depend upon a lookup file object 432 and a key/salt object 434. The lookup file object 432 may comprise a data structure (e.g., a list) indicating possible output values to use when masking. For example, the lookup file object 432 may comprise a lookup table that maps sensitive data to be masked with non-sensitive output values to be used in masking.

The key/salt object 434 may comprise a random or pseudo-random value (e.g., a random sequence of bits) that may be used by the algorithm to determine how data is masked. For example, the value indicated by the key/salt may cause the algorithm to map different output values to the same data, allowing for different instances of the same algorithm to produce unique results. In some embodiments, the lookup file object 432 and key/salt object 434 are internal states of the algorithm object 430, and cannot be synchronized separately from the algorithm object 430.

As illustrated in FIG. 4, the job object 406 and its dependent objects can be packaged together to form an export payload 436. The export payload 436 can be imported by a second masking engine, allowing for the job to be synchronized with the second masking engine. For example, the import/export module of the second masking engine may import the export payload 436 by extracting the various objects within, such as the job object 406, rule set object 410, etc. In addition, the import/export module of the second masking engine may determine a revision state of each referenced object (e.g., domain object 424, algorithm object 430, etc.) and determine if the referenced object needs to be imported into the second masking engine, or if a copy of the referenced object already exists on the second masking engine, thus eliminating the need to import the referenced object. This may potentially decrease an amount of data that needs to be transmitted between different masking engines, as common domains, profiler sets, algorithms, and other global objects that may utilized by multiple different masking jobs may not need to be imported if the second masking engine already has a matching copy.

While FIG. 4 illustrates certain types of object dependencies, it is understood that in some embodiments, certain types of objects may have more or fewer dependencies than those illustrated. For example, in some embodiments, an algorithm object may depend upon one or more other algorithm objects.

In some embodiments, a segmented mapping algorithm is used to mask a particular expression by segmenting the expression and performing one or more algorithms on the segments. Certain expression such as a telephone number, social security number, address, and/or the like, may comprise a plurality of different segments. For example, an address may comprise segments corresponding to a street name, a city, a zip code, etc. The segmented mapping algorithm may define a number of segments, type of segments, and length of segments of a particular type of expression.

Each of the defined segment types may be masked using a different type of algorithm. In addition, with algorithm may depend upon a different lookup file and/or be associated with a different key/salt. In other embodiments, the segmented mapping algorithm is associated with a single key/salt shared by multiple algorithms. As such, if a particular job object depends upon a segmented mapping algorithm, not only will a reference to segmented mapping algorithm object need to be included as part of the export payload, but references to each algorithm depended upon by the segmented mapping algorithm will need to be included as well.

Revision Tracking

In some embodiments, each synchronizable object is associated with revision information used to identify the object and whether or not it has been modified. In some embodiments, the revision information for an object comprises an object identifier and a revision identifier. The object identifier corresponds to a globally unique identifier (GUID) for an object that is fixed for the lifetime of the object. In some embodiments, the object identifier is randomly generated when the object is first created. The object identifier indicates the identity of the object (e.g., an object and a copy of the object will have the same object identifier, even if they are later revised differently). On the other hand, the revision identifier may correspond to a GUID for the object that is updated whenever an object is modified. As such, by using both the object and revision identifiers, whether two objects are of the same type can be determined, as well as if they have been revised relative to each other. If two objects have both the same object identifier and revision identifier, then they can be expected to behave in an identical manner. In some embodiments, two copies of an object may be considered to revised relative to each other if revisions were made on at least one of the objects after the initial copying was performed. For example, if a first object on a first engine is exported to a copy on a second engine, the objects may initially have the same object and revision identifiers. However, if each of the objects are modified at a later time, the revision identifiers will be different, even if the actual revisions made were identical in form. In other embodiments, the revision identifier may be determined in a deterministic manner, such that two objects of the same type (e.g., same object identifier) having the same revisions applied to them may have the same revision identifier, even if the revisions were applied at different times or in a different order.

Because each object may be dependent upon other objects, in order to ensure that a synchronizable object (e.g., a domain) will behave in the same manner between different engines, it is necessary to compare to revision information of not only the object itself, but of any objects the synchronizable object is dependent upon (e.g., profiler set objects, algorithm objects, etc.). For example, when importing onto a masking engine a masking job that references a particular domain object, the domain object may not need to be imported onto the masking engine if the masking engine already has a domain object that behaves in the same way. However, if the domain object is dependent upon an algorithm object having a different revision state from a corresponding algorithm object on the masking engine, then the domain object to be imported will behave differently, even if the revision state of the domain object by itself is the same.

In some embodiments, when a synchronizable object is exported to form an export payload, the export payload is associated with a revision hash that aggregates the revision identifiers of the object and all of its dependencies. As such, if two objects have the same revision hash, then it can be expected that the behavior of the objects (and their respective dependent objects) will be the same. For example, the revision hash for a domain object may be based upon the revision information of all other objects (e.g., profiler set objects and algorithm objects) that the domain object is dependent upon (directly or indirectly).

In some embodiments, the revision hash for an object is determined on-the-fly upon request. For example, when a synchronizable object is requested to be included in an export payload, the import/export module may traverse through the dependencies of the object to determine the revision information for each other object that the synchronizable object is dependent upon. The identified revision information is then aggregated or hashed to produce the revision hash for the synchronizable object. For example, the revision hash may be calculated as a SHA-1 hash of the revision identifier of the object and those of all of the other objects it is dependent upon. When received at a second masking engine, the second masking engine may determine whether to import the object by determining if it maintains any objects of the same type (e.g., having the same object identifier) as the synchronizable object, and if so, determining a revision hash for the determined object to be compared with that of the synchronizable object.

Figure 5:
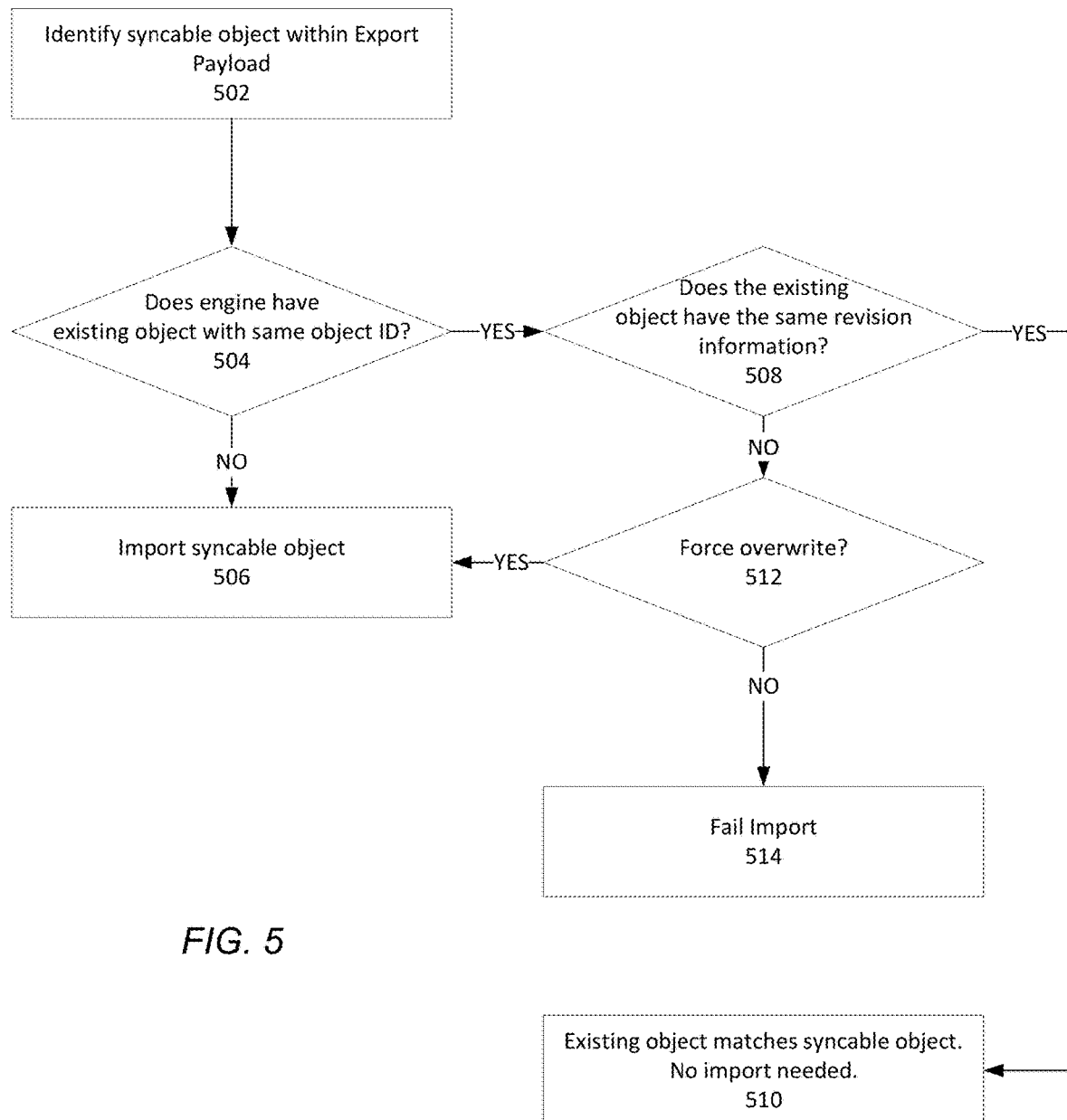
FIG. 5 is a flowchart of a process for handling importation of synchronizable objects, in accordance with some embodiments.

FIG. 5 is a flowchart of a process for handling importation of synchronizable objects, in accordance with some embodiments. The import/export module identifies 502 a synchronizable object within an export payload. The synchronizable object may correspond to a dependent object of the job, such as a domain, an algorithm, and/or the like. In some embodiments, the synchronizable object is a reference to a global object of another engine. The reference may comprise information indicating the type of object, revision information of the referenced object, and/or the like.

The import/export module attempts to identify 504 an object associated with the current masking engine that corresponds to the identified synchronizable object. In some embodiments, the object may correspond to an object of the same type as the synchronizable object. For example, if the synchronizable object corresponds to an algorithm, the import/export module may identify an algorithm object of the same type that is maintained on the current masking engine. In some embodiments, the import/export module identifies an object associated with the current masking engine corresponding to the synchronizable object if the object associated with the current masking engine has an object identifier that matches that of the synchronizable object.

In some embodiments, a corresponding object may not exist on the current masking engine (no object associated with the current masking engine has an object identifier matching that of the synchronizable object), in which case the import/export module imports 506 the identified synchronizable object onto the current masking engine.

On the other hand, if the import/export module is able to identify an object of the current masking engine with an object identifier matching that of the synchronizable object, the import/export module determines 508 whether the revision identifier of the synchronizable object matches that of the identified object. In some embodiments, instead of comparing revision identifiers, the import/export module determines a revision hash for each of the objects, the revision hash reflecting the revision information for the object and any objects it is dependent upon. If the revision hashes match, then the import/export module determines 510 that the identified object associated with the engine matches the synchronizable object, and no operations to import the synchronizable object need to be performed. Instead, the existing object maintained by the engine may be linked to one or more imported objects (e.g., a job object, rule set object), allowing for the object to be used during the performance of an imported job. As such, the job object imported onto the engine will be configured to depend upon the existing object maintained by the engine, which, as had been determined, will have behavior equivalent to that of the synchronizable object.

On the other hand, if the revision information fails to match, the import/export module may determine 512 whether a force overwrite option for the masking engine has been selected. In some embodiments, force overwrite allows for the masking engine to overwrite an existing maintained object with an object of the same type (e.g., same object identifier) received as part of an export payload. As such, if force overwrite has been selected, then the import/export module imports 506 the synchronizable object of the export payload and overwrites the existing maintained object. The imported object may then be used in the performance of a job corresponding to the export payload.

If force overwrite has not been selected, then the import/export module determines 514 that the synchronizable object cannot be imported to overwrite the existing object, and the import fails 516. In some embodiments, the importation of objects associated with an export payload may be atomic, such that when the import of an object fails, the import of all objects associated with the export payload will fail. In other embodiments, if the import of a particular object fails, any previously imported objects may remain on the current masking engine.

As discussed above, an export payload may comprise non-global objects and references to global objects. In some embodiments, non-global objects (e.g., the job object, rule set objects, etc.) are included as part of the payload, and are automatically imported when the export payload is imported at another masking engine. On the other hand, global objects referenced by the export payload, such as algorithm and domain objects (which may often be much larger than non-global objects such as job objects and rule set objects), are imported on an individual basis, using the process described above. As such, global objects associated with an export payload may only need to be imported on an as-needed basis (e.g., if the masking engine does not already have an equivalent global object), potentially reducing an amount of data that needs to be imported.

In some embodiments, an export payload may be very large in size. For example, a particular job object may depend upon a rule set having hundreds of tables and thousands of data columns. As such, the process of exporting the export payload and importing the export payload may take a significant amount of time. In some embodiments, import/export of export payloads may be performed asynchronously. For example, a user may start an import or export operation at a masking engine at a first time, check a status of the import/export at a later time, etc. In some embodiments, when an asynchronous export operation is called (e.g., by a user or a script), an asynchronous export API is called, which returns a handle. The caller may check periodically whether the export was successfully completed, failed, or still in process using the handle. If the export is successful, an additional API call may be made to fetch the underlying data of the export payload (e.g., corresponding to one or more objects).

Process Flow

Figure 6:
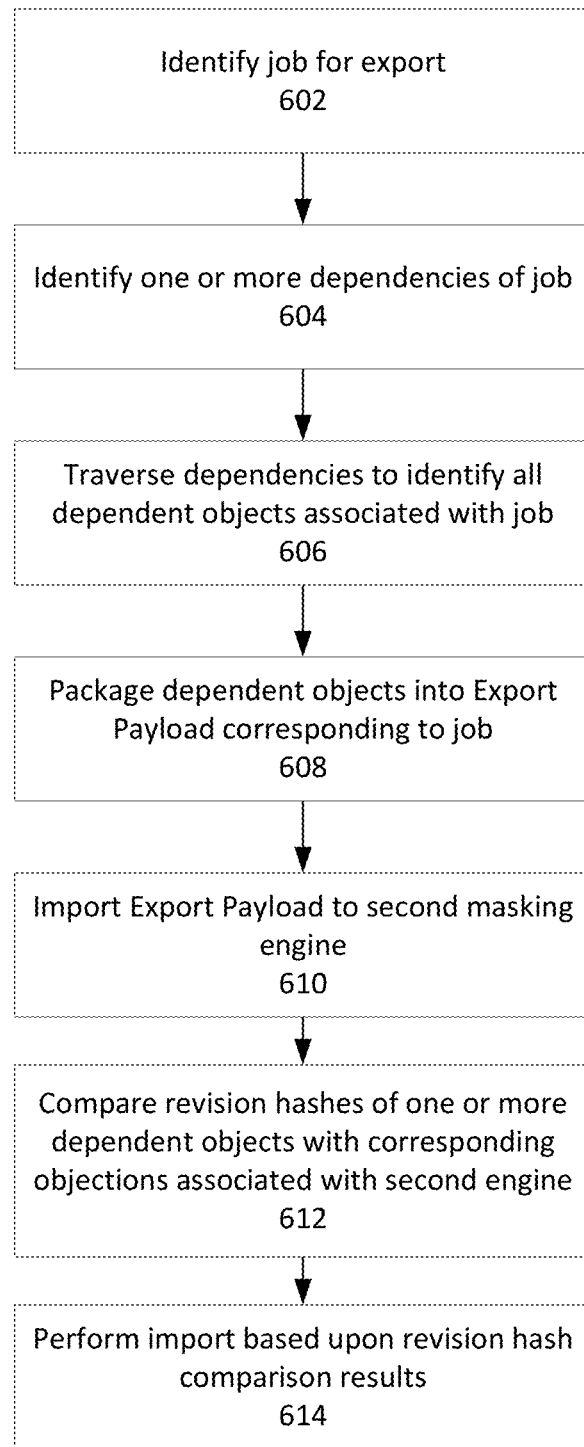
FIG. 6 is a flowchart of a process for synchronizing an object between two masking engines, in accordance with some embodiments.

FIG. 6 is a flowchart of a process for synchronizing an object between two masking engines, in accordance with some embodiments. A first masking engine identifies 602 a job object (e.g., a masking job object) to be exported. In some embodiments, the object may be selected by a user via a user interface. In other embodiments, certain objects may be automatically selected for export. For example, a masking job object may be exported automatically in order to allow for other masking engines to replace the first masking engine in the event of a failure, or to distribute the job over multiple masking engines to be processed in parallel.

The first masking engine identifies 604 one or more dependencies of the job object. For example, the first masking engine may analyze the job object and identify one or more objects that the job object depends upon directly. The first masking engine may then continue to traverse 606 through the dependencies until all objects depended upon by the job object (directly or indirectly) are identified. In some embodiments, at least one of the identified objects may be a reference to a global object maintained by the first masking engine.

The first masking engine, upon identifying all dependencies associated with the job object, packages 608 the identified objects into an export payload. The export payload may include the job object and all identified objects that the job object is dependent upon. In some embodiments, one or more objects contained within the export payload are references to global objects maintained by the first masking engine.

A second masking engine receives 610 the export payload created by the first masking engine. In some embodiments, the second masking engine receives the export payload upon failure of the first masking engine. In other embodiments, the second masking engine receives the export payload such that it can process the job in parallel with the first masking engine.

During importation of the export payload, the second masking engine may compare 612 revision information (e.g., revision hashes) associated with one or more objects. In some embodiments, the objects may correspond to global objects that the second masking engine may already have a copy of. By comparing the revision information between the global object of the export payload and the existing global object maintained by the second masking engine, the second masking engine may determine whether or not it needs to import the new global object or may continue to use its existing global object.

The second masking engine performs 614 importation of the export payload based upon the results of the comparison. For example, if the global object of the export payload has the same revision hash as an existing global object maintained by the second masking engine, then the global object does not need to be imported. On the other hand, if the two objects have the same revision identifier but different revision hashes, the import may fail.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one. The singular also includes the plural unless stated otherwise.

Upon reading this disclosure, those of skill in the art will appreciate still additional alternative structural and functional designs for a system and a process for synchronizing job objects between different engines. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for synchronizing masking job objects between masking engines, comprising:
    at a first masking engine:
        identifying a first object maintained by the first masking engine to be exported, the first job corresponding to a masking job configured to replace a subset of data within a corpus of data identified as sensitive with masked data;
        traversing one or more dependencies of the first object to identify a set of objects that the first object is dependent upon, the set of objects indicating how the masking job is to be performed and including at least one rule set object indicating a structure of data to be processed by the masking job corresponding to the first object, and wherein at least one object of the set of objects is a reference object referencing a second object maintained by the first masking engine and having associated revision information; and
        generating an export payload containing the first object and the set of identified objects;
    at a second masking engine:
        receiving the export payload generated at the first masking engine;
        identifying the revision information of the reference object contained within the export payload;
        comparing the identified revision information with revision information of a corresponding object maintained by the second masking engine;
        importing the reference objects of the export payload based upon a result of the comparison; and
        performing the masking job corresponding to the export payload at the second masking engine in accordance with the objects of the export payload.

2. The method of claim 1, wherein the second object referenced by the reference object corresponds to a set of instructions for mapping one or more input data values to masked data values.

3. The method of claim 1, further comprising:
responsive to a determination that the identified revision information matches the revision information of the corresponding object, not importing the reference object to the second masking engine.

4. The method of claim 3, further comprising:
importing the first object onto the second masking engine, and configuring the first object to depend upon the corresponding object.

5. The method of claim 1, wherein the revision information of the reference object comprises an object identifier identifying the reference object, and a revision identifier identifying a revision state of the reference object.

6. The method of claim 5, further comprising:
responsive to a determination that the object identifier of the identified revision information does not match that of the revision information of the corresponding object, importing the second object into the second masking engine, regardless of whether the revision identifier matches that of the corresponding object.

7. The method of claim 1, wherein the first set of objects further includes a file format object indicating a format of the data to be processed.

8. The method of claim 1, wherein the first set of objects further includes a target connector object comprising information for accessing a database storing at least a portion of the data.

9. The method of claim 1, further comprising generating a revision hash for the reference object corresponding to an aggregation of the revision information of the reference object and at least one other object of the set of objects that the reference object is dependent on, and wherein comparing the identified revision information with revision information of a corresponding object maintained by the second masking engine comprises comparing the generated revision hash with a revision hash of the corresponding object.

10. A computer readable non-transitory storage medium, storing instructions for:
at a first masking engine:
identifying a first object maintained by the first masking engine to be exported, the first job corresponding to a masking job configured to replace a subset of data within a corpus of data identified as sensitive with masked data;
traversing one or more dependencies of the first object to identify a set of objects that the first object is dependent upon, the set of objects indicating how the masking job is to be performed and including at least one rule set object indicating a structure of data to be processed by the masking job corresponding to the first object, and wherein at least one object of the set of objects is a reference object referencing a second object maintained by the first masking engine and having associated revision information; and
generating an export payload containing the first object and the set of identified objects;
at a second masking engine:
receiving the export payload generated at the first masking engine;
identifying the revision information of the reference object contained within the export payload;
comparing the identified revision information with revision information of a corresponding object maintained by the second masking engine;
importing the reference objects of the export payload based upon a result of the comparison; and
performing the masking job corresponding to the export payload at the second masking engine in accordance with the objects of the export payload.

11. The computer readable non-transitory storage medium of claim 10, wherein the second object referenced by the reference object corresponds to a set of instructions for mapping one or more input data values to masked data values.

12. The computer readable non-transitory storage medium of claim 10, further storing instructions for:
responsive to a determination that the identified revision information matches the revision information of the corresponding object, not importing the reference object to the second masking engine.

13. The computer readable non-transitory storage medium of claim 12, further storing instructions for:
importing the first object onto the second masking engine, and configuring the first object to depend upon the corresponding object.

14. The computer readable non-transitory storage medium of claim 10, wherein the revision information of the reference object comprises an object identifier identifying the reference object, and a revision identifier identifying a revision state of the reference object.

15. The computer readable non-transitory storage medium of claim 14, further storing instructions for:
responsive to a determination that the object identifier of the identified revision information does not match that of the revision information of the corresponding object, importing the second object into the second masking engine, regardless of whether the revision identifier matches that of the corresponding object.

16. The computer readable non-transitory storage medium of claim 10, wherein the first set of objects further includes a file format object indicating a format of the data to be processed.

17. The computer readable non-transitory storage medium of claim 10, wherein the first set of objects further includes a target connector object comprising information for accessing a database storing at least a portion of the data.

18. The computer readable non-transitory storage medium of claim 10, further storing instructions for generating a revision hash for the reference object corresponding to an aggregation of the revision information of the reference object and at least one other object of the set of objects that the reference object is dependent on, and wherein comparing the identified revision information with revision information of a corresponding object maintained by the second masking engine comprises comparing the generated revision hash with a revision hash of the corresponding object.

* * * * *